Figure 1:
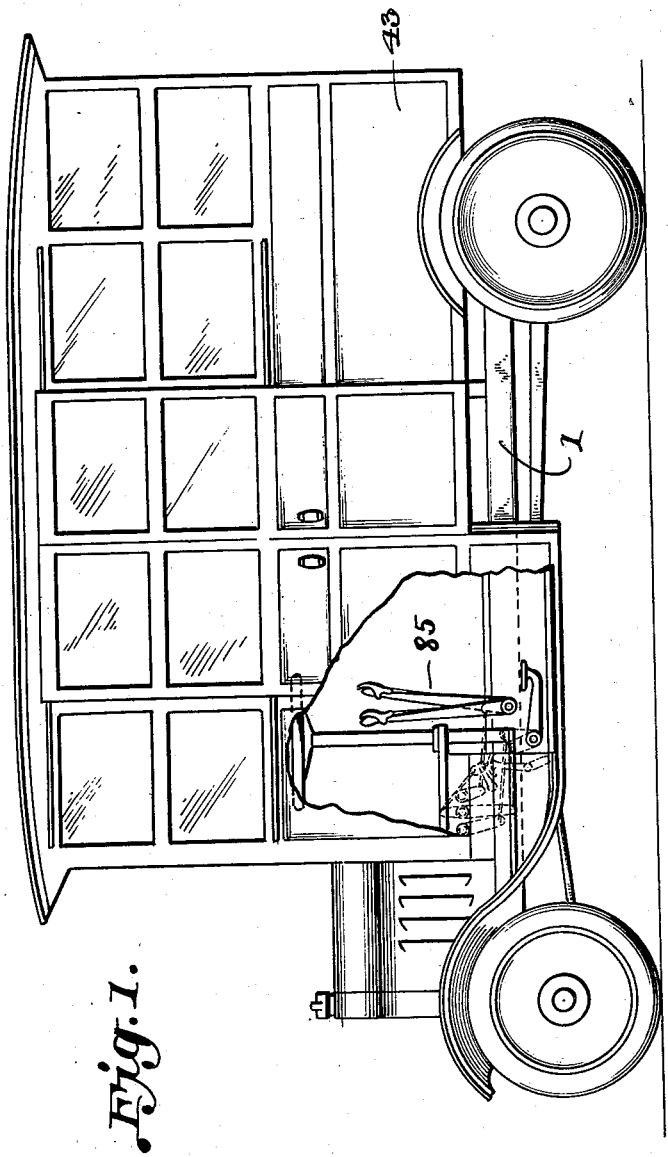

May 3. 1927.

J. H. BUTLER 1,626,718

TRANSMISSION CONTROL

Filed Sept. 14, 1925    4 Sheets-Sheet 1

Jay H. Butler
Inventor

By C. A. Snow & Co.
Attorneys

May 3, 1927.
J. H. BUTLER
1,626,718
TRANSMISSION CONTROL
Filed Sept. 14, 1925 4 Sheets-Sheet 2
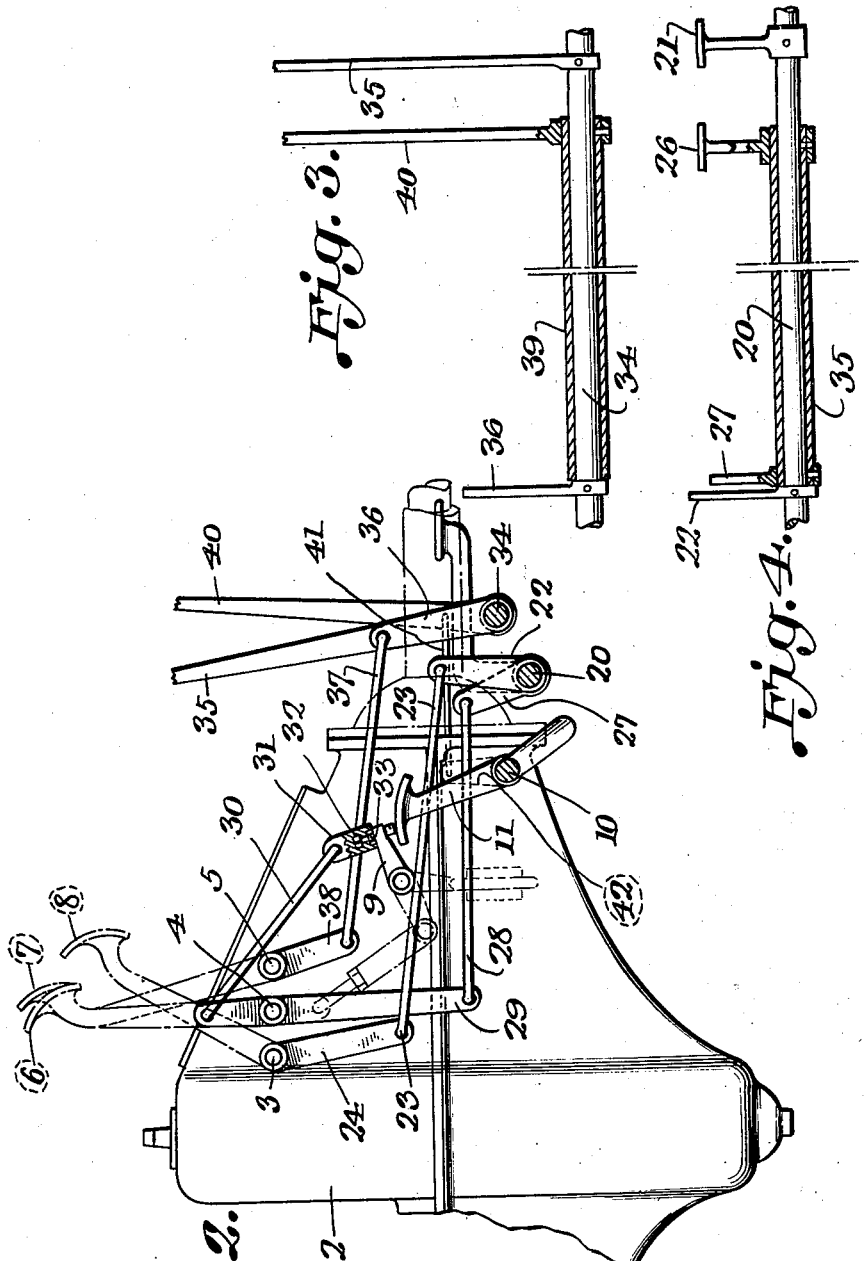
Jay H. Butler
Inventor
By C.A.Snow&Co.
Attorneys

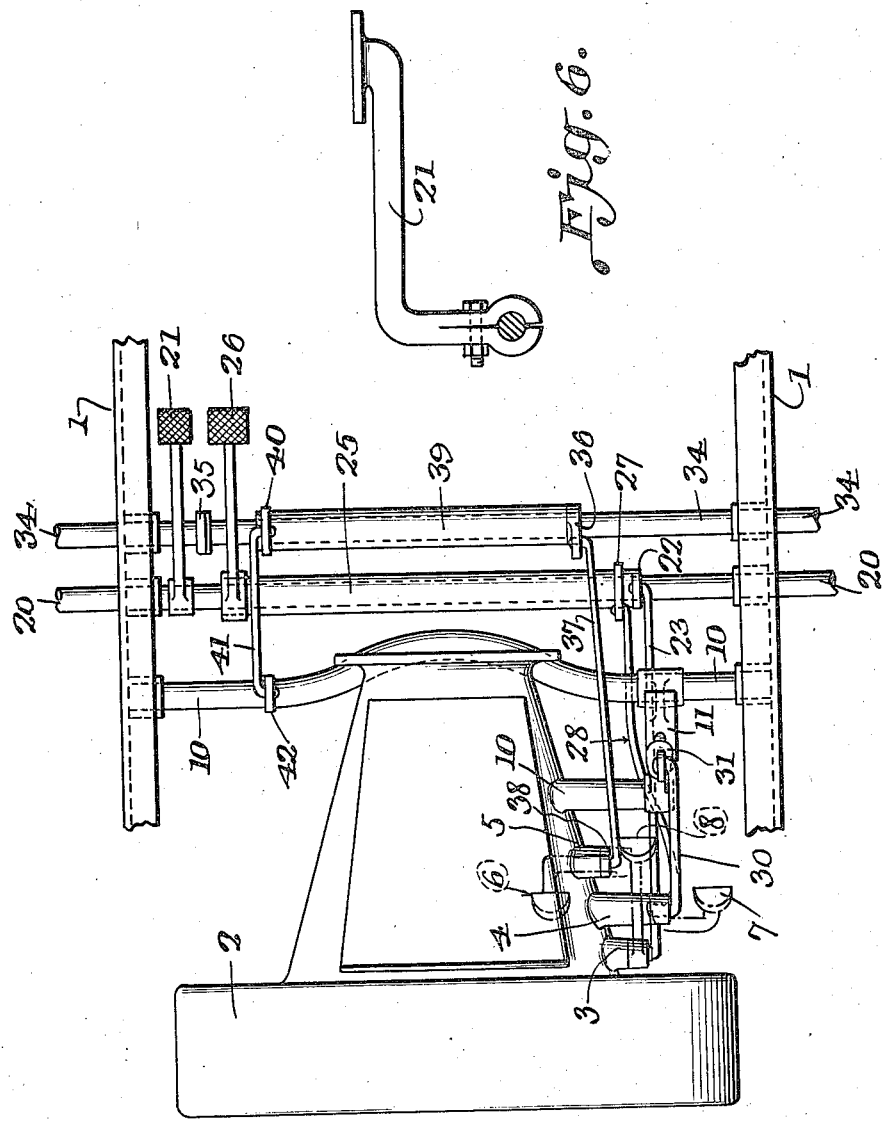

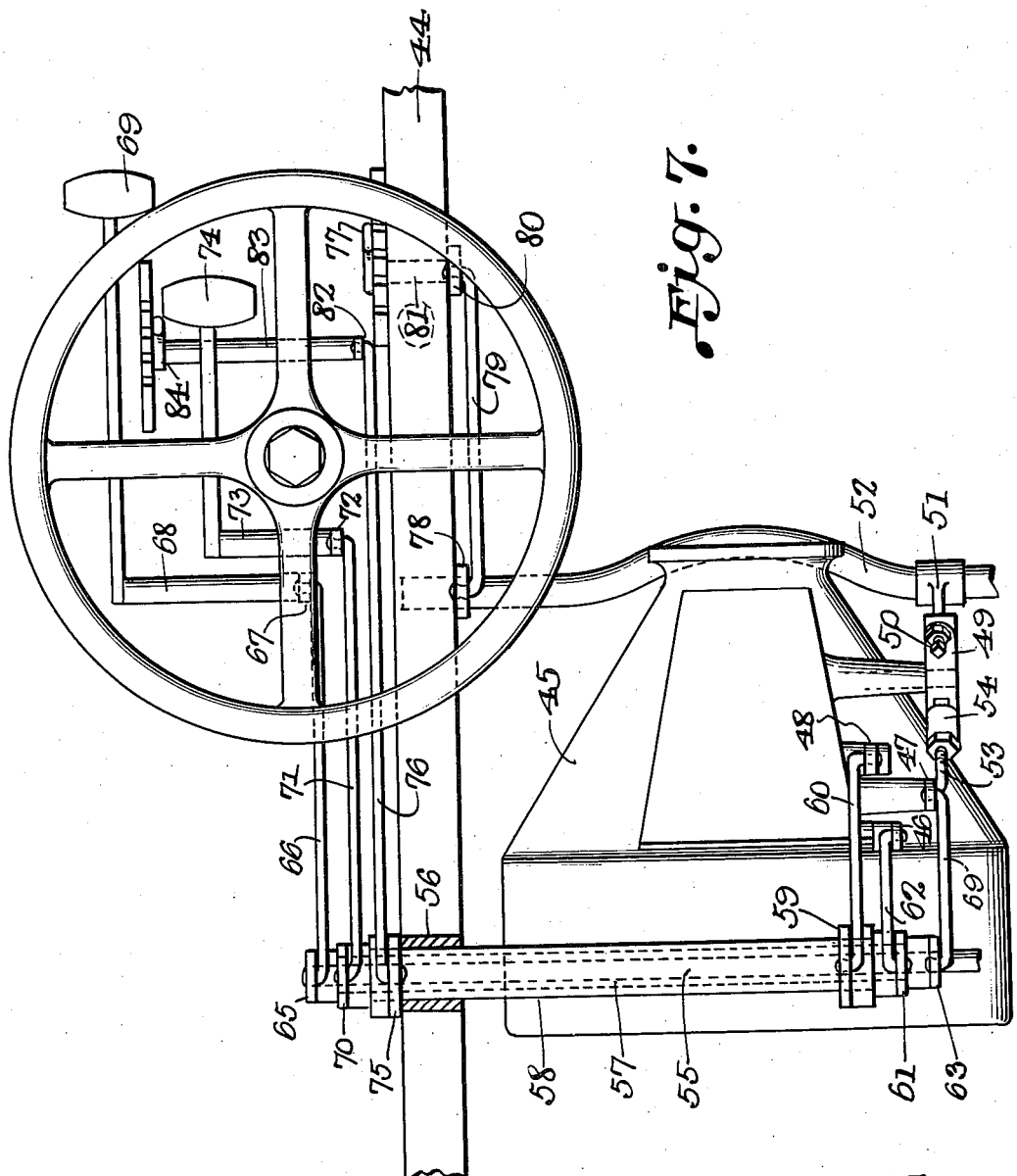

Patented May 3, 1927.

1,626,718

UNITED STATES PATENT OFFICE.

JAY H. BUTLER, OF NEWARK, OHIO.

TRANSMISSION CONTROL.

Application filed September 14, 1925. Serial No. 56,322.

This invention aims to provide novel means whereby the various controls which form part of a standard Ford equipment, may be operated from the right hand side of the vehicle, the construction being such that the operator may stand erect whilst he is driving and controlling the vehicle.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention, applied to an automobile; Figure 2 is a side elevation wherein parts are in section, parts being broken away; Figure 3 is a transverse section showing certain of the shafts; Figure 4 is a transverse sectional view showing others of the shafts; Figure 5 is a top plan of the structure delineated in Figure 2; Figure 6 is an elevation showing one of the pedals; Figure 7 is a plan disclosing a modification.

The numeral 1 marks the frame of a Ford car. The transmission casing is shown at 2, the reverse shaft appearing at 3, the clutch shaft at 4 and the brake shaft at 5. The numerals 6, 7 and 8 denote, respectively, the brake, clutch and reverse pedals of a standard Ford construction. The pedals above specified are shown in dotted line in Figure 2 to illustrate clearly the type of device to which the structure forming the subject matter of this application is to be applied, but, in practical operation, as will be explained hereinafter, the pedals 7, 6 and 8 are removed. The neutral arm appears at 9 and the controller shaft at 10, the speed arm being designated by the numeral 11.

The transverse shaft 20 is journaled on the frame 1 or supported otherwise. The shaft 20 carries, at its right hand end, a reversed pedal 21, the term "right" presupposing that the operator is looking toward the front of the vehicle. There is an arm 22 on the shaft 20 near to the left hand end of the shaft. A rigid connection 23 is pivoted to the arm 22 and to an arm 24 on the reverse shaft 3, the reversed pedal 8 being removed.

It is obvious that an operator standing at the right hand side of the vehicle can operate the reverse mechanism through a train of parts comprising the pedal 21, the shaft 20, the arm 22, the connection 23, and the arm 24.

A tubular shaft 25 is mounted to rock on the shaft 20. At its right hand end, the tubular shaft 25 carries a clutch pedal 26. There is an arm 27 on the left hand end of the shaft 25. A rigid connection 28 is pivoted to the arm 27 and to an arm 29 mounted intermediate its ends on the clutch shaft 4, the clutch pedal 7 being removed.

By means of the clutch pedal 26, the shaft 20, the arm 27, the connection 28, and the arm 29, the operator can manipulate the clutch mechanism from the right hand side of the vehicle.

A rigid connection 30 is pivoted to the upper end of the arm 29 on the clutch shaft 4, and to a bracket 31 mounted on the rear end of the neutral arm 9. The bracket 31 carries an adjusting screw 32 held in place by a lock nut 33. The lock nut 33 coacts with the speed arm 11, on the controller shaft 10.

A transverse shaft 34 is journaled for rotation on the frame 1 or supported otherwise. The shaft 34 carries a service brake hand lever 35, located near to the right hand side of the vehicle. The shaft 34 is provided with an arm 36. A rigid connection 37 is pivoted at its rear end to the arm 36, and at its forward end to an arm 38 mounted on the brake shaft 5. The arm 38 replaces the brake pedal 6.

An operator standing at the right hand side of the vehicle can apply the service brake by a train of elements including the hand lever 35, the shaft 34, the arm 36, the connection 37, and the arm 38.

A tubular shaft 39 is mounted to rock on the shaft 34. At its right hand end, the tubular shaft 39 has a hand lever 40, which is used in place of the ordinary emergency hand brake lever. In connection with the hand levers 40 and 35, it will be understood that any suitable latch mechanism may be used, the latch mechanism being omitted for the sake of simplicity, since the provision of a latch mechanism is something that lies well within the skill of a mechanic. The hand lever 40 is connected by a link 41 with an arm 42 on the controller shaft 10.

When the hand lever 40 is used, in the ordinary way, to apply the emergency brake, the shaft 39 is rocked, and the link 41, cooperating with the arms 40 and 42, rotates the controller shaft 10, the speed arm 11 cooperating with the parts 9, 31 and 30 to throw out the brake and place the machine in neutral.

The construction of the device is such that the various controls on a Ford car are carried over to the right hand side of the car, so that an operator standing erect at the right hand side of the car may operate the machine. In Figure 1, there is shown a vehicle including a full delivery body, but it is to be understood that the device forming the subject matter of this application can, of course, be used with a cab or any other kind of a body, or, indeed, with no body at all. In Figure 1, the body is denoted by the numeral 43.

Referring to Figure 7, the frame is marked by the numeral 44 and the transmission casing by the numeral 45. The reverse arm is shown at 46 and the clutch arm at 48. The neutral brake arm appearing at 48. The neutral arm is shown at 49, the bracket, corresponding to the bracket 31, appears at 54, and the adjusting screw is shown at 50. The numeral 51 marks the speed arm and the numeral 52 designates the controlling shaft. The connection between the bracket 54 and the arm 47 of the clutch mechanism is designated by the numeral 53.

A transverse shaft 55 is supported for rotation at 56, and extends across the top of the transmission casing 45. A hollow shaft 57 is journaled on the shaft 55. A hollow shaft 58 is journaled on the shaft 57. There is an arm 59 on the left hand end of the tubular shaft 58. A connection 60 is pivoted to the arm 59 and to the brake arm 48. The hollow shaft 57 has an arm 61. A connection 62 unites the arm 61 with the reverse arm 46. There is an arm 63 on the left hand portion of the shaft 55. A connection 64 is pivoted to the arm 63 and to the clutch arm 47.

On the right hand end of the shaft 55 there is an arm 65 united by a connection 66 with an arm 67 on a shaft 68, supported for rocking movement, the shaft 68 carrying a rearwardlly extended pedal 69. The shaft 57 is supplied at its right hand end with an arm 70 united by a connection 71 with an arm 72 on a shaft 73 supported for rocking movement, and provided with a pedal 74. On the right hand end of the shaft 58 there is an arm 75, united by a connection 76 with an arm 82 on a shaft 83 supported for rocking movement, the shaft 83 carrying a lever 84. The controller shaft 52 has an arm 78 united by a connection 79 with an arm 80 on a shaft 81 supported for rocking movement, the shaft 81 carrying a lever 77.

The operation of the device as shown in Figure 7 will be understood readily from what has been stated hereinbefore in connection with the form shown in Figure 6, and it will be obvious, that, in Figure 7, the controlling mechanism is carried over to the right hand side of the vehicle.

In the event that the operator wishes a control at each side of the vehicle, the mechanism above described may be duplicated, at the left hand side of the vehicle, as indicated generally by the numeral 85 in Figure 1.

Having thus described the invention, what is claimed is:

1. In a device of the class described, a transmission mechanism having reverse and clutch shafts at one side of said mechanism, second shafts journaled one upon the other, arm and link connections between the second shafts and the clutch and reverse shafts, and means for operating said shafts, said means being located on the opposite side of the transmission mechanism.

2. In a device of the class described, a transmission mechanism having reverse and clutch shafts located at one side of said mechanism, second shafts journaled one upon the other, arm and link connections between the second shafts, and the clutch and reverse shafts, and pedals on the second shafts, the pedals being located at the opposite side of the transmission mechanism.

3. In a device of the class described, a transmission mechanism comprising a neutral device located at one side of the transmission mechanism, a controller shaft supported for rotation, a speed arm on the controller shaft and cooperating with a neutral device, and means for operating the controller shaft from the opposite side of the transmission mechanism.

4. In a device of the class described, a transmission mechanism comprising a neutral device located at one side of the transmission mechanism, a controller shaft supported for rotation, a speed arm on the controller shaft and cooperating with a neutral device, another shaft supported for rotation, means for rotating the last-specified shaft, an arm and link connection between the last-specified shaft and the controller shaft.

In testimony that I claim the foregoing as my own, I have hereto affixed my signature.

JAY H. BUTLER.